United States Patent [19]

Swoboda

[11] Patent Number: 4,514,322
[45] Date of Patent: Apr. 30, 1985

[54] PHOSPHOROUS-DOPED TIN OXIDE POWDER

[75] Inventor: Thomas J. Swoboda, Landenberg, Pa.

[73] Assignee: E. I. Du Pont de Nemours and Company, Wilmington, Del.

[21] Appl. No.: 602,000

[22] Filed: Apr. 19, 1984

[51] Int. Cl.³ .............................................. H01B 1/06
[52] U.S. Cl. ................................................... 252/518
[58] Field of Search .............. 252/518, 500; 75/0.5 A, 75/0.5 B; 428/402, 403, 407; 419/19, 23, 32, 34, 35, 56; 427/217, 215, 216, 123

[56] References Cited

U.S. PATENT DOCUMENTS

| 4,246,143 | 1/1981 | Sonoda et al. | 252/518 |
| 4,276,537 | 6/1981 | Shimizu | 252/518 |
| 4,347,165 | 8/1982 | Matheson | 252/518 |
| 4,373,013 | 2/1983 | Yoshizumi | 252/518 |
| 4,450,188 | 5/1984 | Kawasumi | 427/217 |

FOREIGN PATENT DOCUMENTS 2077182A 12/1981 United Kingdom .

OTHER PUBLICATIONS

Journal of Electrochemical Soc., Jul. 1980, pp. 1592-1599.
Journal of Electrochemical Soc., Jun. 1976, pp. 941-944.

Primary Examiner—Josephine L. Barr

[57] ABSTRACT

Phosphorus-doped tin oxide provides conductive powder of light coloration.

7 Claims, 1 Drawing Figure

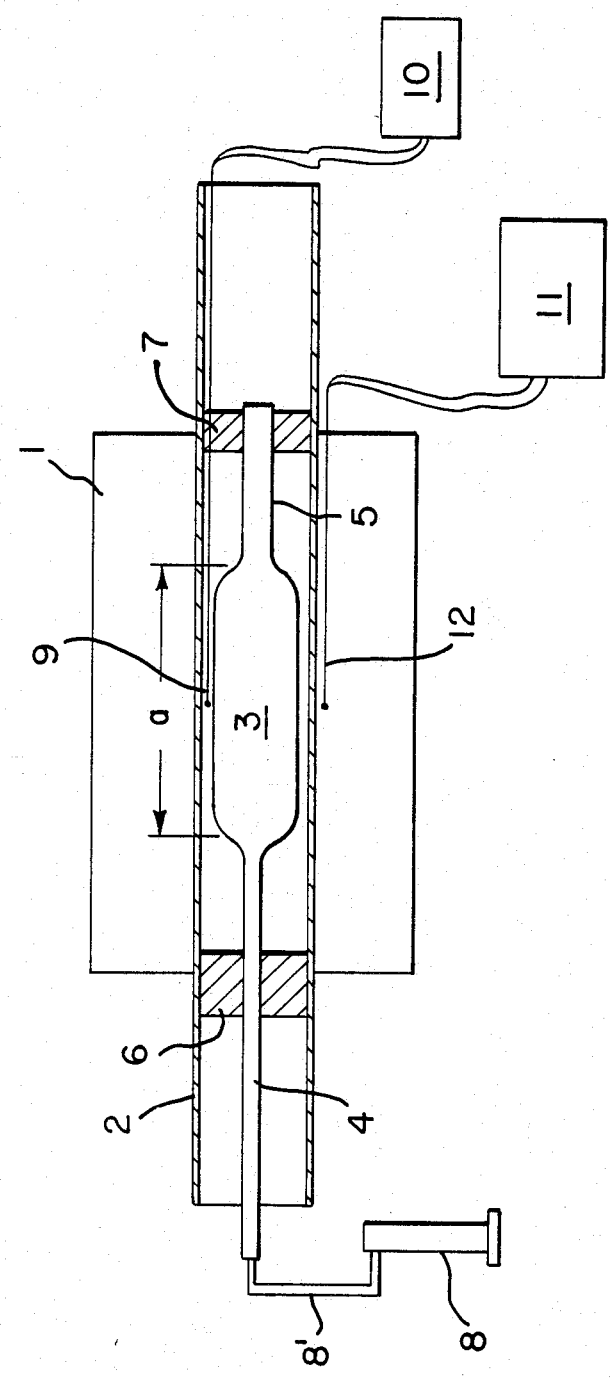

though the reaction vessel and exits through ex tube 5.

PHOSPHOROUS-DOPED TIN OXIDE POWDER

BACKGROUND OF THE INVENTION

This invention concerns a novel conductive powder, its preparation and use.

The effect of phosphorus doping upon the conductivity of tin oxide films made by oxidation of phosphine and tetramethyltin is discussed in the Journal of the Electrochemical Society July 1980 pp. 1592–1599. The films are prepared on a substrate and are essentially fused to the substrate. No technique is disclosed for removal of the film.

Conductive composite filaments useful for improving the antistatic properties of fibrous articles are described in the U.K. Patent Application 2077182A. These filaments are described as comprising a conductive component composed of a polymer and conductive metal oxide particles bonded to a non-conductive component composed of a fibre-forming polymer. Suitable metal oxide powders taught therein include a product obtained by firing a mixture of tin oxide and antimony oxide.

The present invention is directed to obtaining improved conductive powder with light coloration.

SUMMARY OF THE INVENTION

This invention provides a process for preparing a powder of phosphorus-doped tin oxide comprising the steps (a) combining dehydrated metastannic acid with red phosphorus in proportions to provide from about 1 to 4 atom % phosphorus in the doped tin oxide and sand milling the composition in an azeotropic liquid comprising methanol in a halogenated hydrocarbon, (b) evaporating the azeotropic liquid from the product obtained in (a), (c) separating the milled phosphorus and tin oxide mixture from the sand, and (d) heating the mixture of phosphorus and tin oxide in an inert gas at a temperature within the range of 450° C. to 700° C. and for a time sufficient to obtain a phosphorus-doped tin oxide power having a conductivity of at least 0.1 ohm$^{-1}$ cm$^{-1}$ at a density of 3.48 g/cm$^3$. Also provided is a phosphorus-doped tin oxide powder exhibiting a conductivity of at least 0.1 ohm$^{-1}$ cm$^{-1}$ at a density of 3.48 g/cm$^3$, said powder having a particle size within the range of 0.02 to 1.5 microns and containing from about 1 to 4 atom % phosphorus and compositions of the powder dispersed in a thermoplastic synthetic polymer.

DESCRIPTION OF THE DRAWING

FIG. 1 is a schematic cross-sectional view of a flow-through reactor useful in the process of this invention.

Tube furnace 1 heated by nickel-chrome wires (not shown) surrounds Mullite tube 2 which is 33-inches (83.8 cm) long by 3-inches (7.6 cm) outside diameter. Hollow reaction vessel 3 is tubular in shape [2.24 inches (57 mm) outside diameter] and is connected to gas entry tube 4 and gas exit tube 5. The reaction vessel, entry tube, and exit tube are of fused silica. The distance "a" is approximately 8 inches (20.3 cm). Radiation shields 6 and 7 composed of any suitable material prevent excessive heat loss from the furnace interior. Temperature of the furnace, sensed by a suitable sensor 9 located within the furnace adjacent the reaction vessel, is indicated by temperature recorder 10. A computer/controller 11 connected to temperature sensor 12 is used to regulate furnace temperature. In actual operation, the reaction vessel 3 containing the reaction mixture is heated as required by the surrounding furnace. Nitrogen gas from supply cylinder 8 flows through tube 8′ and entry tube 4, into the reaction vessel wherein it flows through the reaction mixture and then through exit tube 5 to the atmosphere.

DETAILED DESCRIPTION OF THE INVENTION

1. Preparation of Phosphorus-Doped Tin Oxide

In the preparation of the phosphorus-doped tin oxide powder, dehydrated metastannic acid is sand milled with red phosphorus in an azeotrope selected on the basis that it is a low boiling hydrophobic compsition capable of wetting the tin oxide and being removed by evaporation when milling is completed. The milled phosphorus and tin oxide mixture are then separated from the sand and heated in an inert gas atmosphere at a temperature within the range of 450° C. to 700° C. for a time sufficient to obtain a phosphorus-doped tin oxide powder having a conductivity of at least 0.1 ohm$^{-1}$ cm$^{-1}$ at a density of 3.48 g/cm$^3$. The doped tin oxide powder should have a particle size within the range of about 0.02 to 1.5 microns, preferably from 0.1 to 1 micron and should contain from about 1 to 4 atom % phosphorus.

Dehydrated metastannic acid used in the process of this invention is prepared from metastannic acid obtained from Keeling and Walker Ltd., Stoke-on-Trent, England. The product is a hydrated stannic oxide containing 14 to 16% water made by dissolving pure tin metal (99.8%) in concentrated nitric acid at 120° C. The product has a specific gravity of 4.05, particle size 2–3 μm and a surface area of 0.8–1.0 m$^2$/g. To obtain the dehydrated material, the metastannic acid is placed in a shallow Pyrex evaporating dish and held in a vacuum oven at approx. 500 mm Hg with slow dry nitrogen bleed with the temperature slowly rising from 90° C. to 145° C. over several hours. After an approximately 7% water loss, the product is placed in a porcelain crucible which is placed in a muffle furnace. With a slow oxygen flow through the furnace, the product is heated to 450° C. over 1.5 hours and held at that temperature until there is a further water loss of approximately 8.5%.

The dehydrated metastannic acid is mixed and sand milled with phosphorus as follows: 540 g of the dehydrated metastannic acid, 2.22 g red phosphorus (99.9%-325 mesh, dry), 1500 g sand (Ottawa; 20–30 mesh, hydrochloric acid extracted to remove impurities, water-washed, dried and fine particles removed through a 40 mesh screen) and 525 ml trichlorotrifluoroethane/5.7% methanol azeotrope are added to a 64 oz glass jar with a screw cap having a tough leak-proof plastic linear. The jar is cylindrical with essentially equal diameter and height. The jar is placed on a commercial paint shaker and shaken vigorously for four hours while being air-cooled. Larger particles are produced if the sand milling time is reduced.

The jar is then opened and placed in a flow-through (dry N$_2$) vacuum oven at room temperature and at a vacuum of 6″ Hg (approx. 150 mm) to evaporate the azeotropic mixture. The temperature and vacuum are allowed to rise slowly to 48° C. and 26″ (approx. 660 mm) Hg over an eight hour period and held there overnight. The jar contents are transferred to a 100 mesh screen and shaken through to removed sand. 480 g of SnO$_2$/P blend are obtained.

445 g of this product is loaded to a reaction tube (illustrated in FIG. 1) and flushed with inert gas, preferably pure $N_2$ at 100 ml/min and room temperature for one hour. The furnace is heated to 625° C. at 3.8° C./min; at 150° C., the nitrogen flush is lowered to 25 ml/min for rest of run. The furnace is held at 625° C. for one hour, then the tube slid off. The tube is then cooled over a period of ½ hour with the nitrogen flush still flowing. 431 g of pale tan fluffy powder is obtained. The use of higher heating temperatures results in larger particles.

The P-doped $SnO_2$ contains 2.0 atom % phosphorus. It has a dry powder compact conductivity $3.7 \times 10^{-1}$ $ohm^{-1}cm^{-1}$ at a density of 3.48 $g/cm^3$, surface area of 65 $m^2/g$, and weight average particle (agglomerate) size of 0.45 micron (x-ray Sedigraph) with 95% of sample <1 micron and 90%>0.1 micron.

By varying the proportion of red phosphorus added to the dehydrated metastannic acid before milling, doped tin oxide containing from about 1 to 4 atom % phosphorus may be obtained. Such products are useful for purposes of the present invention.

The dry powder conductivity is measured as follows:

0.4 gm dry powder to be analyzed is placed into an insulated cylindrical die body equipped with two opposed conductivity pistons (cross-section area of 0.28 $cm^2$ each) attached to a standard resistance meter. The sample is then compressed by the pistons to the desired density. Resistivity is then measured with the resistance meter.

2. Preparation of Antistatic Composition

A mixture of the following ingredients is prepared: 70% (by weight) P-doped $SnO_2$ powder obtained above; 24.4% finely divided polyethylene powder having a melt index of 26; 4.3% paraffin in chip form having a melting point of 55° C.; 0.3% antioxidant (1,3,5-trimethyl-2,4,6-tris(3,5-di-tert-butyl-4-hydroxybenzyl)-benzene); 0.7% Sedisperse ® A-11 (a colorless, nonpolar, saturated aliphatic hydrocarbon liquid dispersing agent, containing 98% base mineral spirits, 0.1% phosphatidyl choline, 0.1% inositol phosphatides, and 1.7% isopropyl myristate blended with alkyl polyoxyethlene ethanols, available from Micromeritics, Norcross, Ga.; 0.5% Jeffamine T-403 (poly(oxyethylene) triamine, available from American Cyanamid Co., Wayne, NJ). The Sedisperse ® and Jeffamine are surfactants which are used to reduce the viscosity of the composition.

The mixture is made by shaking the P-doped $SnO_2$, polyethylene powder and antioxidant using a commercial paint shaker and then blending through a 100-mesh screen. The mixture is then agitated in a cylindrical vessel to a degree sufficient to create a fluidized powder. The two liquid surfactants are slowly added to the agitating fluidized bed. The mixture is then hot rolled with the paraffin between two oppositely rotating rollers at 150° C. The composite material is then homogenized at 120°–180° C. in a twin-screw blender which forces it through stainless steel wire screens (mesh ranging 50–325) to form a rope [approx. 0.125–0.25 inch (0.318–0.635 cm) in diameter] which is chopped to 0.125-inch (0.318 cm) lengths.

The use of other thermoplastic synthetic polymers, (which need not be fiber-forming) as matrix media for the phosphorus-doped tin oxide powder is within the scope of the present invention. Thus for example, polyamides, polyesters and polyolefins may be employed. The percentage of powder in the conductive composition is preferably in the range of about 65 to 75% by weight. The polymers may be blended with other materials such as oils and waxes to facilitate processing.

3. Preparation of Antistatic Fiber

Approximately 25 g of the P-doped $SnO_2$-polyethylene antistatic composition is hot pressed into a cylindrical plug and placed in a press spinning cell. The cell is a 0.75-inch (1.91 cm)-diameter vertically mounted cylindrical steel tube fitted with a removable piston at the top end and a cap at the bottom end. The cap contains a central 9 mil (0.00354 cm) orifice. The cell is heated to approximately 290° C. Pressure is applied to the plug causing a 200 μm thick elongated fiber to extrude from the orifice. The fiber has a resistance per unit length of $3.26 \times 10^7$ ohms/inch which indicates potential use as a component in an antistatic textile fiber.

The conductive powder of this invention is of particular interest because of its light coloration. This characteristic is useful in antistatic fibers or other articles where light coloration is important. The powder can be used to impart electrical conductivity to plastics in general whether in fiber, film or block form. One such use would be to minimize tendency for plastic surfaces to accumulate electrostatic charges.

I claim:

1. Process for preparing a powder of phosphorus-doped tin oxide comprising the steps
   (a) combining dehydrated metastannic acid with red phosphorus in proportions to provide from about 1 to 4 atom % phosphorus in the doped tin oxide and sand milling the composition in an azeotropic liquid comprising methanol in trichlorotrifluoroethane,
   (b) evaporating the azeotropic liquid from the product obtained in (a),
   (c) separating the milled phosphorus and tin oxide mixture from the sand, and
   (d) heating the mixture of phosphorus and tin oxide in an inert gas at a temperature within the range of 450° C. to 700° C. and for a time sufficient to obtain a phosphorus-doped tin oxide powder having a conductivity of at least 0.1 $ohm^{-1}cm^{-1}$ at a density of 3.48 $g/cm^3$.

2. The process of claim 1 wherein the azeotropic is a mixture of 5.7% methanol in trichlorotrifluoroethane.

3. The process of claim 1 wherein a sufficient amount of red phosphorus is added in step (a) to provide about 2 atom % of phosphorus in the doped tin oxide.

4. Phosphorus-doped tin oxide powder exhibiting a conductivity of at least 0.1 $ohm^{-1}cm^{-1}$ at a density of 3.48 $g/cm^3$, said powder having a particle size within the range of 0.02 to 1.5 microns and containing from about 1 to 4 atom % phosphorus.

5. The product of claim 4 having a particle size within the range of about 0.1 to 1 micron.

6. The product of claim 4 containing from 1.5 to 2.0 atom % phosphorus.

7. A conductive composition comprising the powder of claim 4 dispersed in a thermoplastic synthetic polymer in an amount of about 65 to 75% by weight of the composition.

* * * * *